(12) United States Patent
Shi et al.

(10) Patent No.: US 6,674,953 B2
(45) Date of Patent: Jan. 6, 2004

(54) CONTROLLABLY VARIABLE OPTICAL ATTENUATOR

(75) Inventors: Zhupei Shi, San Jose, CA (US); Tongxin Lu, San Jose, CA (US); Minh Tran, San Jose, CA (US); Jerry Lee, Saratoga, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 10/038,079

(22) Filed: Jan. 2, 2002

(65) Prior Publication Data

US 2002/0085827 A1 Jul. 4, 2002

Related U.S. Application Data

(60) Provisional application No. 60/259,393, filed on Jan. 3, 2001.

(51) Int. Cl.[7] .......................... G02B 6/00; G02B 27/28; G02B 5/30; G02B 27/14
(52) U.S. Cl. ...................... 385/140; 359/484; 359/629; 385/134
(58) Field of Search .......................... 385/140; 359/484, 359/629

(56) References Cited

U.S. PATENT DOCUMENTS

| | | | | |
|---|---|---|---|---|
| 4,281,897 A | * | 8/1981 | Fletcher | 356/434 |
| 5,011,265 A | * | 4/1991 | Tamamura et al. | 359/629 |
| 5,781,341 A | * | 7/1998 | Lee | 359/578 |
| 6,266,474 B1 | * | 7/2001 | Han et al. | 385/140 |
| 2001/0021302 A1 | * | 9/2001 | Jaspan | 385/140 |
| 2002/0001447 A1 | * | 1/2002 | Tei et al. | 385/140 |
| 2002/0122251 A1 | * | 9/2002 | De Boynton et al. | 359/484 |

* cited by examiner

*Primary Examiner*—John D. Lee
*Assistant Examiner*—Tina M Lin

(57) ABSTRACT

A controllable attenuator includes a pair of collimators respectively connected to input and output fibers. A pair of reflection devices are respectively positioned behind the pair of collimators opposite to the corresponding input and output fibers. A U-like light path is defined among the pair of collimators and the pair of reflection devices. A neutral density filter is moveably positioned between the pair of reflection devices wherein a moving direction of the filter is preferably parallel to a longitudinal direction of the pair of collimators. An ND filter position indicator such as a potentiometer, is used to dynamically monitor attenuation setting.

4 Claims, 11 Drawing Sheets

CONTROLLABLY VARIABLE OPTICAL ATTENUATOR

This application claims the benefit of and refers to a provisional application filed Jan. 3, 2001 with a Ser. No. 60/259,393.

BACKGROUND OF THE INVENTION

1. Field of the Invention

The invention relates to the optical power regulators for fiber optical network, and particularly to a variable optical attenuator (VOA) for controllably varying the strength of the optical signals.

2. The Related Arts

In the fiber optic networking system, the light signals are transited along optical fibers to transfer information from one location to another. It is often desirable to tailor the power of the optical signals within optical fiber networks. For example, the individual components of an optical fiber network may be tested by using a low power optical signal to simulate fiber optic telecommunications or data communications over a long distance. Tailoring of optical signal strengths is expected in automatic optical testing systems, optical signal routing systems, and optical sensor arrays etc.

U.S. Pat. No. 5,3111,613 issued on Oct. 5, 1999, describes an attenuator based on polarization modulator (a liquid crystal material). This type attenuator has an issue of controlling PDL (polarization dependent loss), and the associated optical performance is subject to the environmental temperature.

U.S. Pat. No. 5,745,634 issued Apr. 28, 1998, describes a voltage-controlled attenuator where the optical path consists of two collimators, one mirror and one filter. The driving means of the filter is constructed by a DC motor, a gearbox, and a rotation disk. There is a lever labeled 30 in FIG. 2B thereof which connects the filter and the rotation disk. This mechanical structure has a concern of difficulties of making the VOA device compact since the optical path of the optical components is essentially parallel to the mechanical structures. Also, the cost of this device is relatively high since the precision gearbox is utilized thereof for implementation of the whole design.

U.S. Pat. No. 6,130,984 issued Oct. 10, 2000, discloses a voltage controlled VOA device. A dual fiber collimator is used. In terms of the topical performance, it has a concern of the PDL. Also, the filter driving means, i.e., the motor, is arranged perpendicular to the direction of the fiber or the optical path. This type design results in irregular package size. As illustrated in column 6, lines 5–10 thereof, the device length along the fiber direction is 37 mm, but the device width perpendicular to that fiber direction, is 70 mm. It means that the width is much longer than the length. In respect with the optical system design, there is a desire to have a smaller device width for the compact system equipment. U.S. Pat. No. 6,292,616 demonstrates a U-like frame to form an optical path where the ND filter is designed to be wedge-shaped to reduce the wavelength sensitivity. However this device is subject to the relatively large PDL thus being unsuitable for the high-speed optical network. In general, the PDL requires <0.1 dB for the data transfer rate of 10 Gb/s and 0.05 dB for the data transfer rate of 40 Gb/s. Also, such a device lacks the filter position indicator to precisely monitor the desired position of the ND filter. Thus, the user can not dynamically control the optical attenuation setting. It is hardly integrated into the practical optical network management.

In light of the foregoing, it would be desirable to provide improved structures and methods for attenuating optical signals, and particularly with low cost and high reliabilities.

SUMMARY OF THE INVENTION

According to an aspect of the invention, a controllable attenuator comprises a first collimator for receiving the incoming light beam and directing the light beam along a first beam path. A first 45° mirror changes the light beam by 90°, and a second 45° mirror successively changes the light beam by another 90°. Then, the light beam enters the second collimator and leaves therefrom via a fiber. A controllable attenuating device, i.e., the associated a ND filter, is located between the first mirror and the second mirror, and is generally laterally moveable in the optical path for varying the attenuation of the outing light beam.

Yet, a miniature driving means of the ND filter is provided with a stepping motor connected to a lead screw for driving the ND filter, and a potentiometer place under the ND filter to read the precise position of the ND filter.

Advantageously according to the present invention the attenuation can be continuously adjusted over a broad range. The electrical signal from the potentiometer gives a feedback to dynamically tune the attenuation. Also, the whole device is well compacted via unique combination of the optical components and the electrical and mechanical driving device.

DETAILED DESCRIPTION OF THE PREFERRED EMBODIMENTS

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

Figure 1:
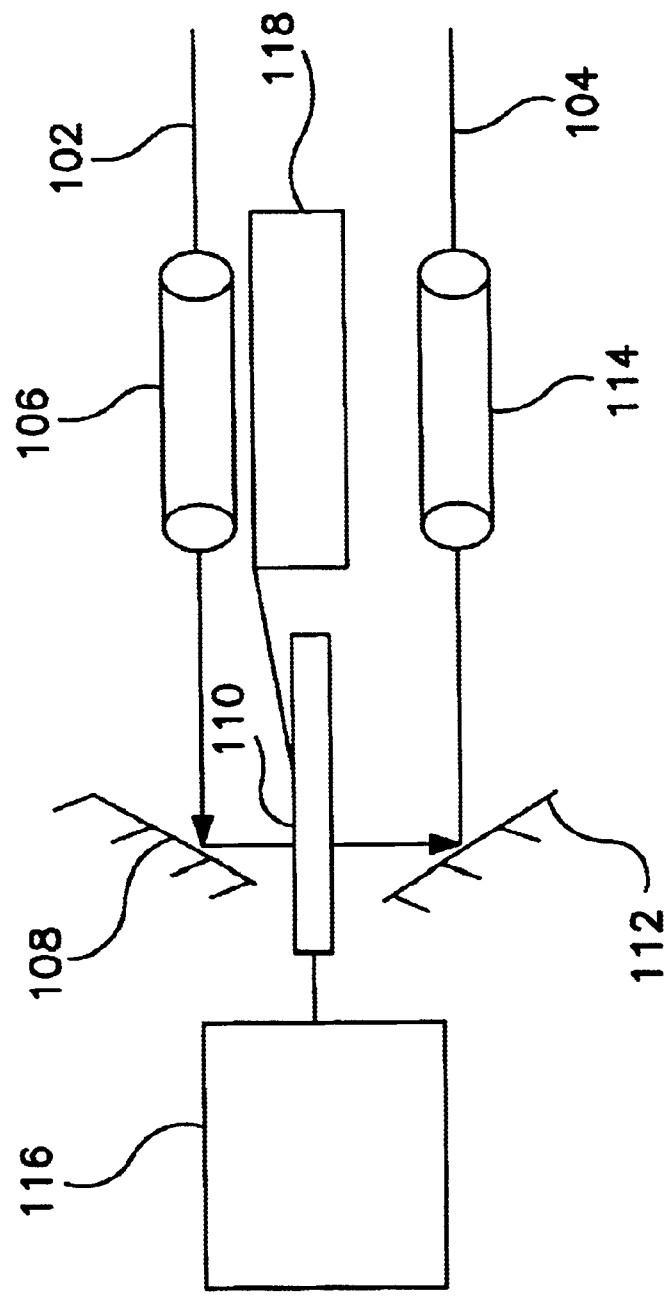
FIG. 1 shows a block diagram of a presently preferred embodiment of an electrically controlled variable optical attenuator with potentiometer, according to the invention.
Figure 2:
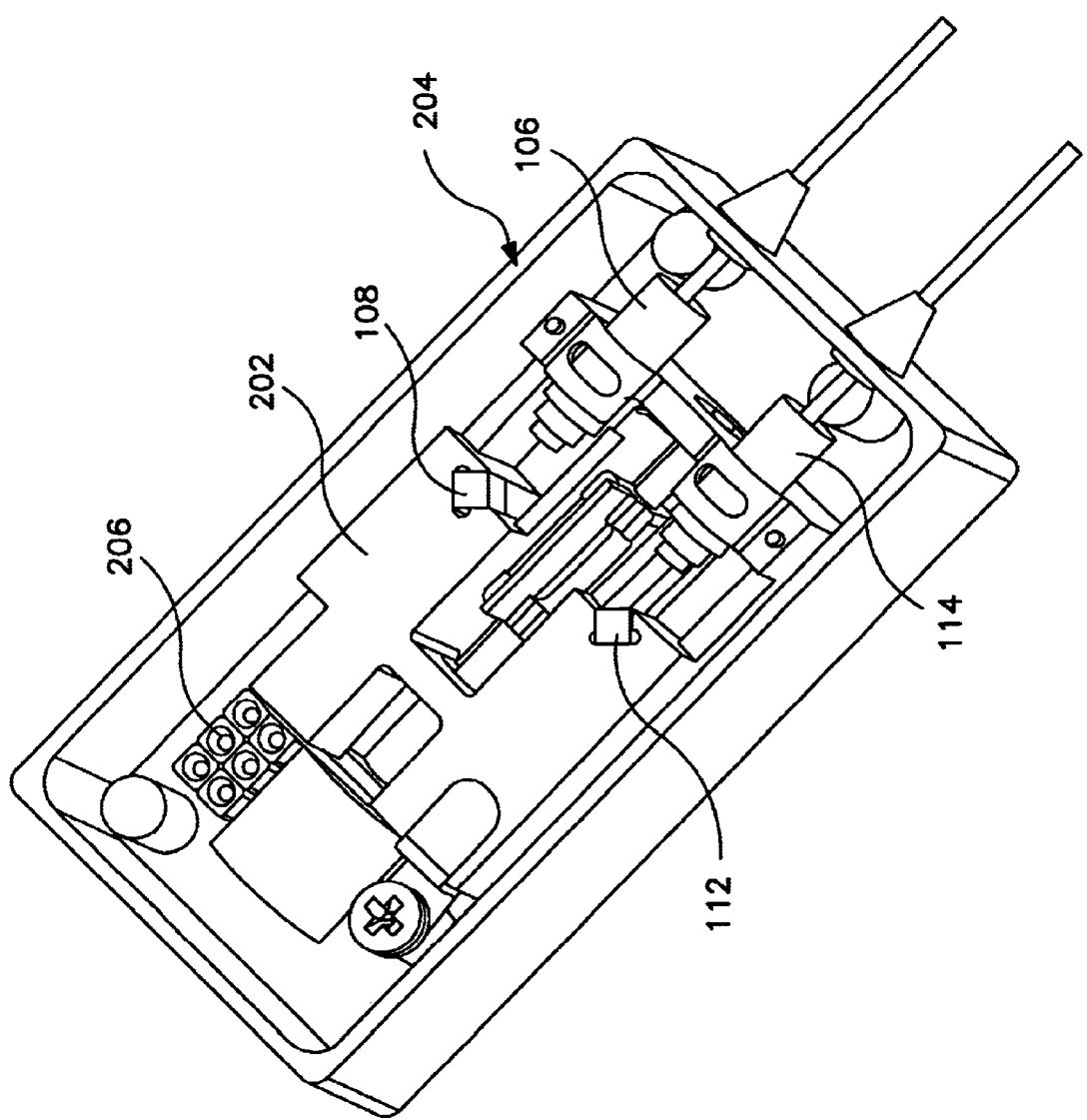
FIG. 2 shows a perspective view of the attenuator of FIG. 1.
Figure 3:
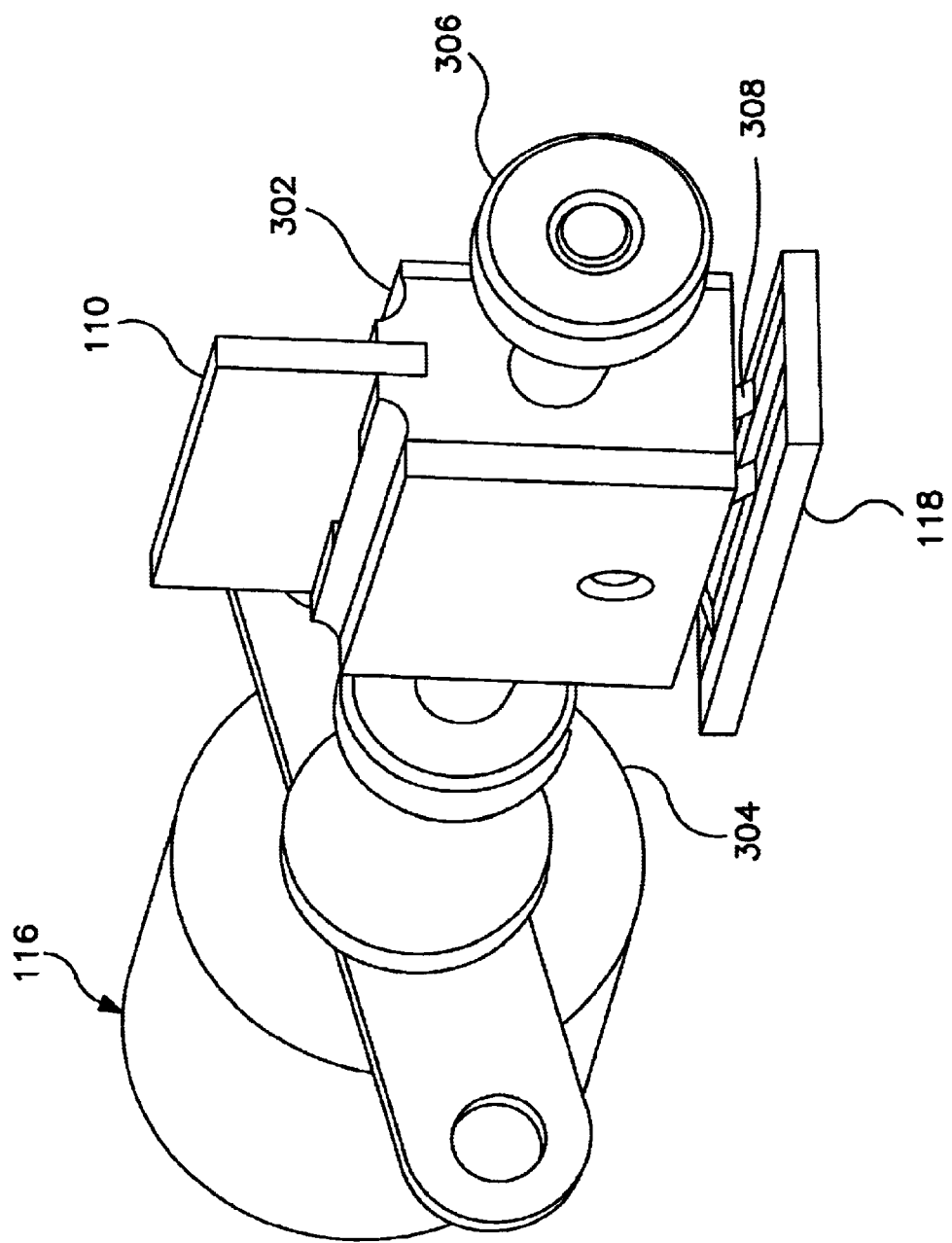
FIG. 3 is an enlarged perspective illustrative view of the driving device and the associated ND.

It will be noted here that for a better understanding, most of like components are designated by like reference numerals throughout the various figures in the embodiments. Attention is directed to FIGS. 1–3 wherein the electrically controlled variable optical attenuator 1 includes an input port 102, i.e., the fiber in, and an output port 104, i.e., the fiber out, arranged on the same side of a mounting base or the VOA case 204.

A first collimator 106 is connected to the input port 102 and a first reflection device 108, i.e., the first 45 degrees dielectric mirror in this embodiment, is located behind the first collimator 106 and opposite to the input port 102. A second collimator 114 is connected to the output port 104 and a second reflection device 112, i.e., the second 45 degrees dielectric mirror in this embodiment, is located behind the second collimator 114 and opposite to the output port 104. The first collimator 106 and the second collimator 114 are arranged to be parallel to each other. The first reflection device 108 is tilted at 45° relative to the first collimator 106, and the second reflection device 112 is tilted at 45° relative to the second collimator 114, wherein the first reflection device 108 and the second reflection device 112 are directed toward each other with a 90° angle therebetween. All the first collimator 108, the second collimator 114, the first reflection device 108 and the second reflection device 112 are fixed to a substrate 202 which is fixed to the mounting base or the VOA case 204.

An ND filter 110 is interposed between the first reflection device 108 and the second reflection device 112 to block the light beam path. A stepping motor 116 is located beside the ND filter to move it along a direction perpendicular to a light beam path transmitted between the first reflection device 108 and the second reflection device 112 for controlling attenuation thereof. The ND filter further connects to a potentiometer 118 whereby the electrical signal from the potentiometer 118 gives the precise position of the ND filter 110. Moreover, an electrical connection port 206 is disposed inside of the VOA case 204 for electrical connection of the stepping motor 116 and the potentiometer 118.

Thus, the main light beam from the input port 102 enters into the first collimator 106 and passes it to directly hit the first reflection 108, thereby making a 90° direction change. The light further passes the ND filter 110 with attenuation effect occurring thereof, and successively hits the second reflection device 112 to be reflected, with a 90° direction change, toward the second collimator 114, and finally leaves the second collimator 114 via the output port 104. The light beam path between the input port 102 and the output port 104 are essentially of a U-like configuration regulated by the first collimator 106, the second collimator 114, the first reflection device 108 and the second reflection device 112 with two arms of such a U-like configuration are respectively defined between the first collimator 106 and the first reflection device 108, and the second collimator 112 and the second reflection device 112 and with the bight between such two arms being defined between the first reflection device 108 and the second reflection device 112 wherein the movement of the ND filter 110 is along the longitudinal direction of the two arms.

The ND filter 110 sits upon a lead screw nut 302 as shown in FIG. 3. The nut 302 itself mechanically lings to a lead screw 304. The stepping motor 116 is also connected to the lead screw 304. A silicon rubble coupler connects the step motor and the lead screw. Understandably, using the rubble coupler has advantage of allowing relatively large mechanical misalignment tolerance between the step motor axis and the center axis of the lead screw. It is good for high yield rate manufacturing. As electrical pulses gets into the stepping motor 116, the motor 116 makes the lead screw 304 to rotate via the ball bearing 306. The rotating lead screw 304 moves the ND filter holder, i.e., the nut 302, forward or backward. Moving the nut 304 changes the position of the ND filter 110 and thus the attenuation value is tuned.

Figure 4:
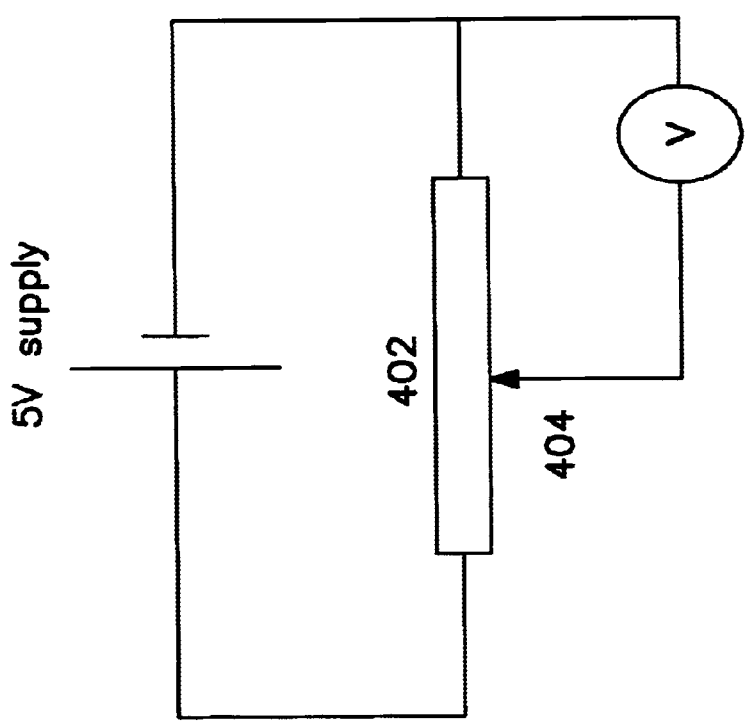
FIG. 4 shows an equivalent circuit of the potentiometer.

With reference to FIG. 3, the potentiometer 118 is placed under the lead screw nut 302. The wiper 308 sticks on the nut 302. This arrangement makes the potentiometer 118 as a position indictor of the ND filter 110. As shown in FIG. 4, the potentiometer 118 is equivalent to a resistor 402 and the wiper 308 acts as a linear variable resistor 404. It is required to have a power supply such as 5 Volts to electrically connect to the potentiometer 118. It also requires a voltage meter to read out the wiper electrical signal. All these can be done the electrical connection port 206.

Figure 5:
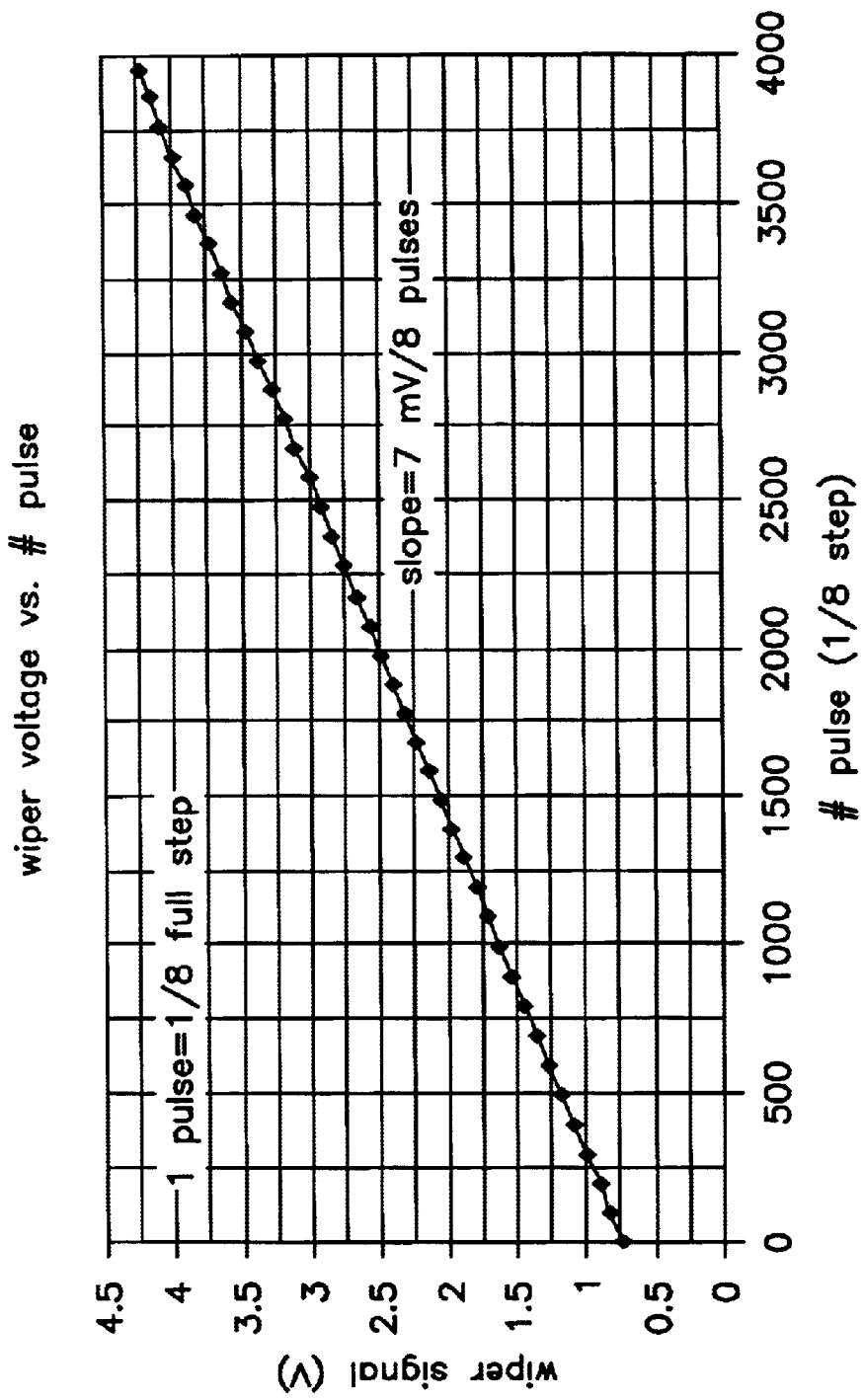
FIG. 5 plots the linear relationship between the wiper voltage of the potentiometer and the number of the pulses into the step motor.

In order to move the ND filter 110, the user needs to send electrical pulses to the stepping motor 116. The ND filter will move when the lead screw 304 rotates. Understandably, the moving distance is proportional to the number of the electrical pulses into the stepping motor 116. The wiper signal, i.e., the electrical voltage, is linearly dependent upon the moving distance of the ND filter 110. It means that the wiper voltage reading and the number of the electrical pulses into the stepping motor 116, have the linear relationship with each other. FIG. 5 shows the measured data of the wiper reading and the number of the electrical pulses where the curve is substantially straight, thus confirming the linear relationship therebetween.

Figure 6:
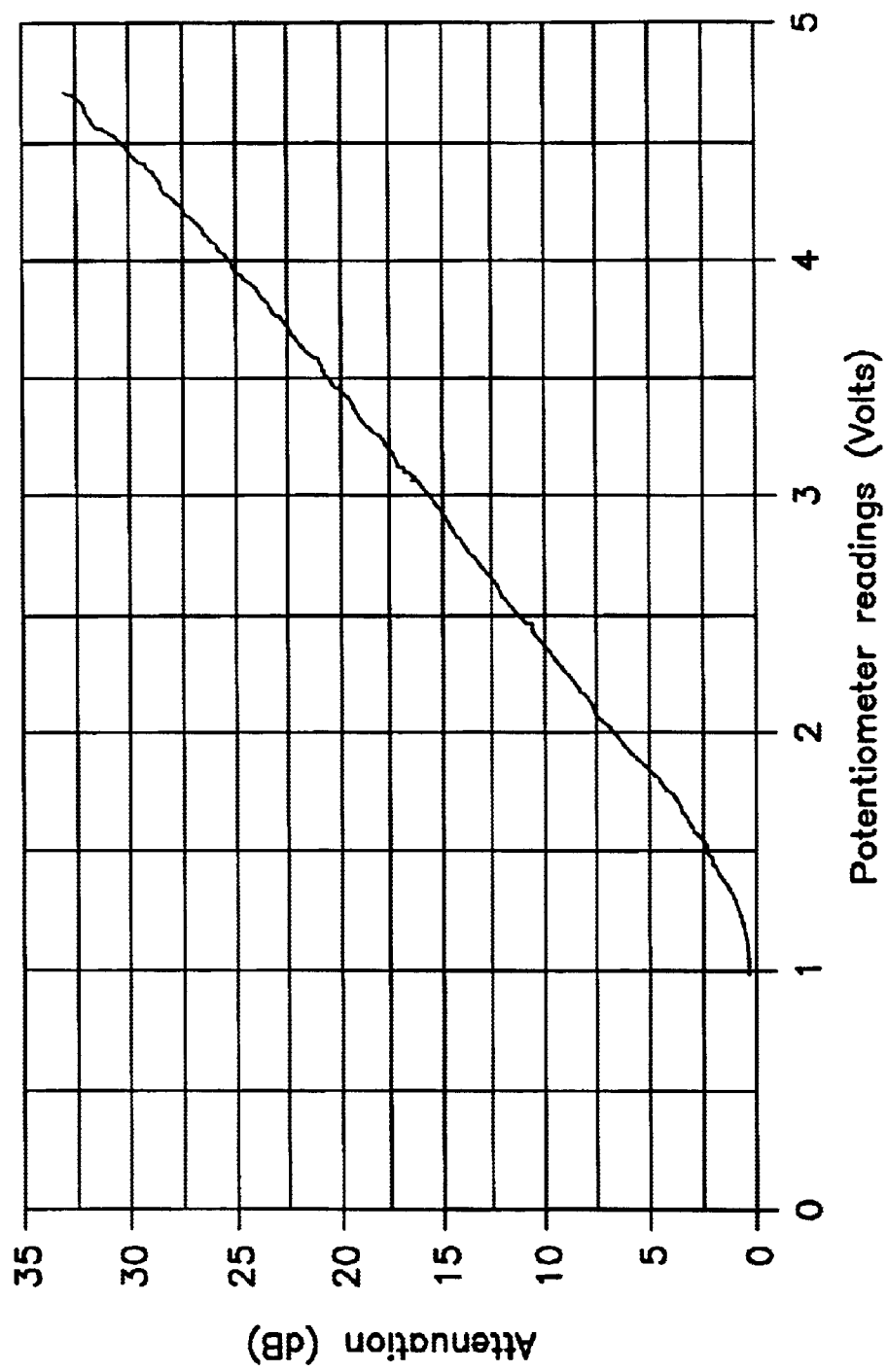
FIG. 6 describes the measured data of the attenuation vs. the wiper voltage.

One of the unique design feature is that the sending electrical pulses to the stepping motor 116 results in changes of the wiper voltage reading and the attenuation value. It means that there is a relationship between the attenuation and the wiper voltage signals. The measured data of the attenuation with its corresponding wiper voltage are shown in FIG. 6 whereby the corresponding curve provides the optical system designers with the feedback loop of dynamically tuning the attenuation. Also, the wiper voltage reading provides the crash stop signals for the ND filter of hitting the substrate walls. For example, the minimum and maximum voltages in FIG. 6 are 0.72 V and 4.21 V, respectively. These minimum and maximum voltages are crash stop signals. For the normal operation, the wiper signal should be in a range of the minimum and the maximum voltages such as 0.72 V< the wiper reading <4.21 V in FIG. 6. Basically, the curve in FIG. 6 is a desired feature of a VOA device for the optical network management.

Figure 7A:
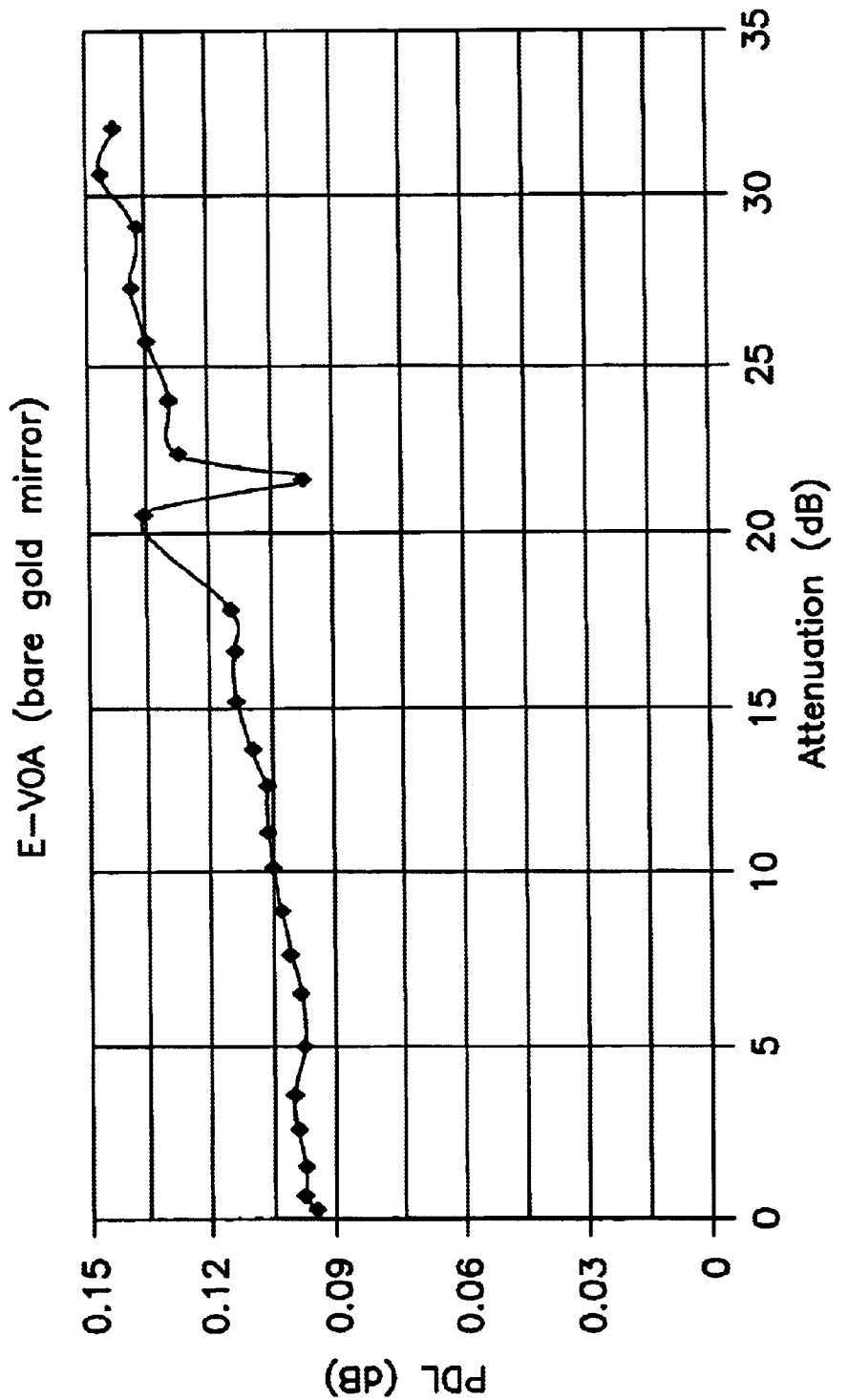
FIG. 7A plots the PDL measured at wavelength at wavelength of 1550 nm as a function of the attenuation.
Figure 7B:
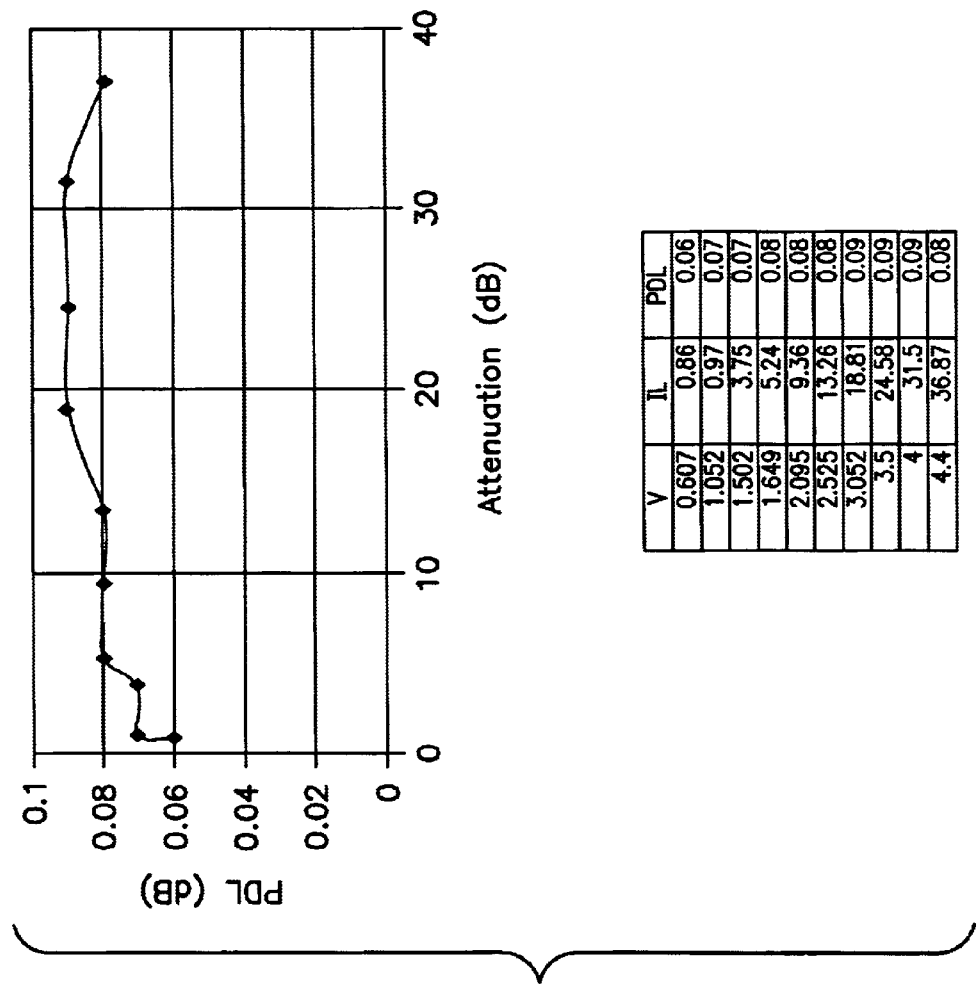
FIG. 7B plots the PDL measured at wavelength of 1550 nm as a function of the attenuation when the 45 degrees mirror is used thereof.

The PDL will be a problem for the high speed of the optical network of 10 Gb/s or above. When a regular mirror such as bare gold mirror used in the aforementioned prior art U.S. Pat. No. 6,292,616, the measured PDL at wavelength of 1550 nm for such a VOA has relative large value, close to 0.15 dB for attenuation up to 35 dB (FIG. 7A). It can not meet requirement of PDL<0.1 dB for the optical network with the transfer rate of 10 Gb/2. In this invention, the specified 45 degrees dielectric mirror is utilized for the PDL control. Then the PDL can reach <0.1 dB for attenuation up to 30 dB, as shown in FIG. 7B.

Figure 7C:
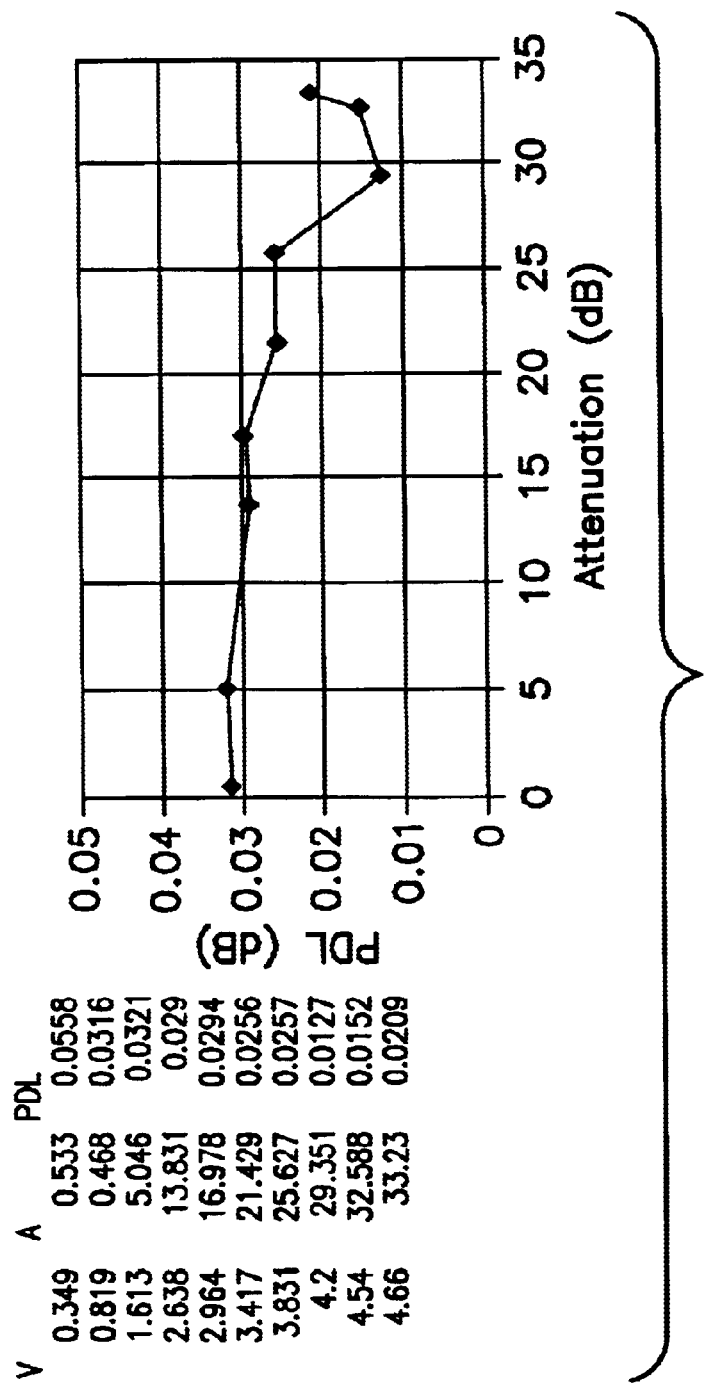
FIG. 7C plots the PDL measured at wavelength of 1550 nm as a function of the attenuation when the prism is used.
Figure 8:
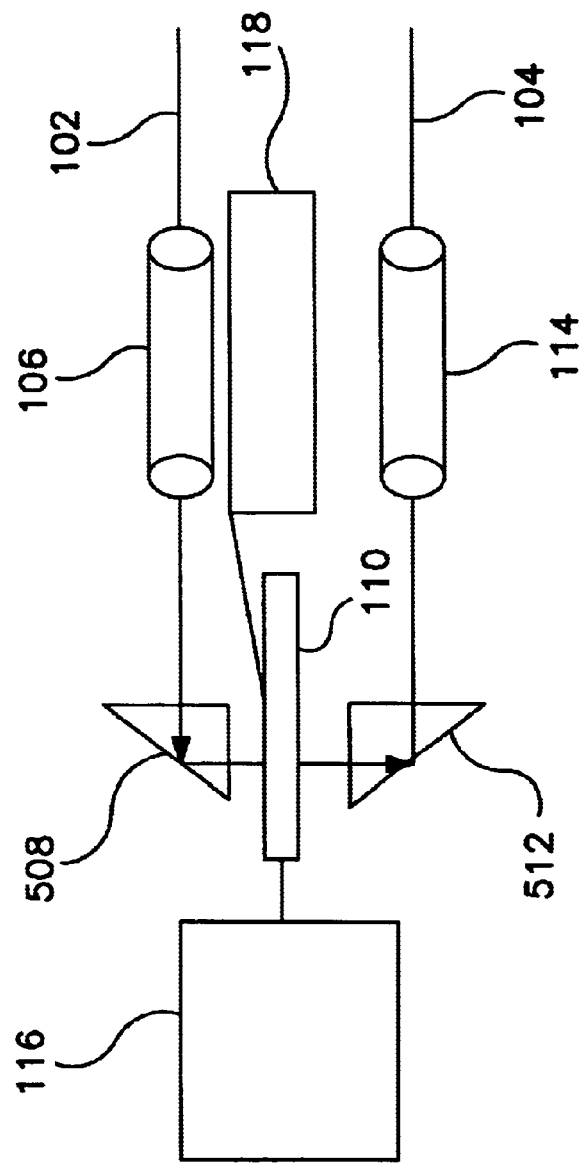
FIG. 8 is a block diagram of another embodiment of the VOA device where the prisms are used to reflect the light beam.

Another embodiment is shown in FIG. 8 where the first reflection device 108 and the second reflection device 112 of FIG. 1 are replaced by two prisms 508 and 512. The feature of the total light reflection, i.e., 100% reflection, of the prisms 508, 512, can further reduce the PDL and minimum insertion loss (IL) of the device. FIG. 7C shows the PDL is less than 0.04 dB for attenuation even over 30 dB, which definitely meets requirement of the PDL <0.05 dB for the high speed (>10 Gb/s) optical network such as 40 Gb/s transfer rate.

Figure 9:
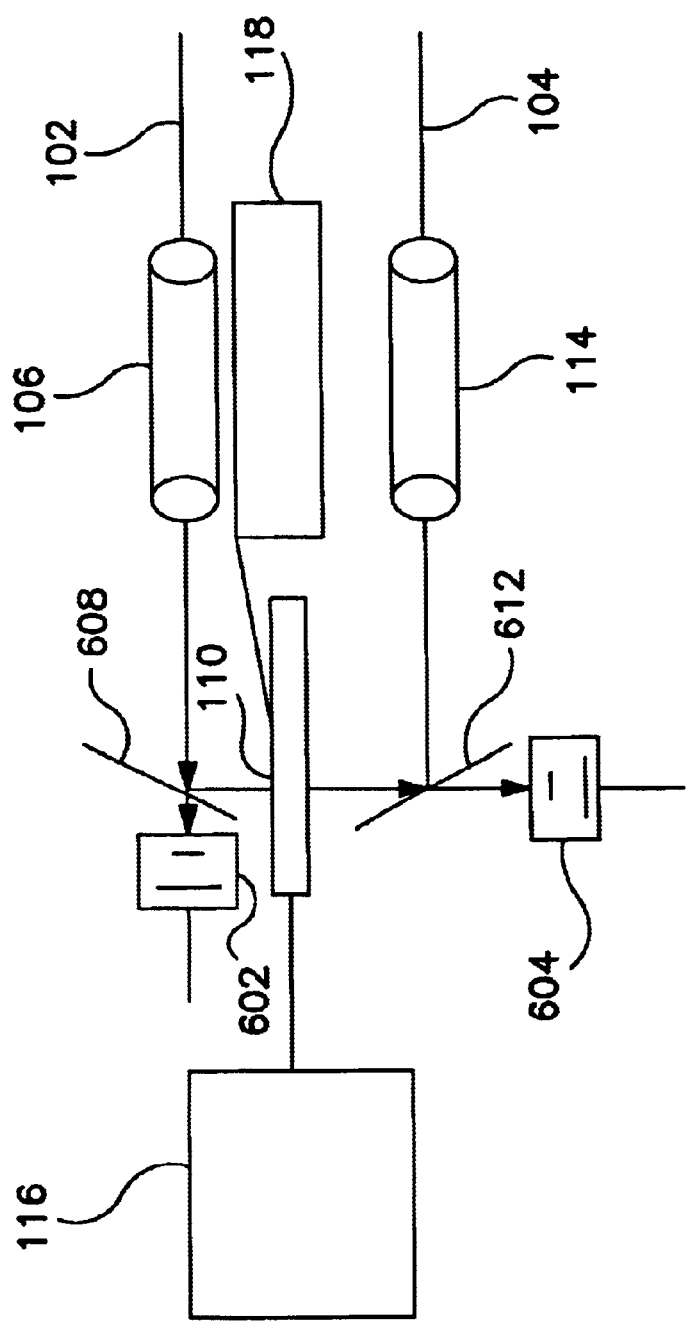
FIG. 9 reveals another embodiment of the VOA device where two photo detectors tap out incoming the outgoing light powers for real time monitoring the optical power in the optical network.

FIG. 9 demonstrates another embodiment where the first reflection device 108 and the second reflection device 112 of FIG. 1, are replaced by first and second beam splitters 608 and 612. The first beam splitter 608 reflects most of light, but taps out a small percentage, i.e., 1%–5%, of the light intensity. Such a tap-out light beam is detected by a photo diode/detector 602 which just sits behind the splitter 608. Similarly, the second beam splitter 612 also reflects mot of light and also taps out a similar small percentage, i.e., 1%–5%, of the incoming light. A second photo diode/detector 604 is placed behind the second beam splitter 612 and detects the tap-out signal from the second beam splitter 612. The tap-out signals from the first photo detector 602 and the second photo detector 604 gives the actuarial values of the incoming and outgoing light power, respectively. It means that this VOA device provides option of real time monitoring light power in the optical network, thus resulting in great advantage for the optical network management.

In conclusion, the invention uses two 45 degrees dielectric mirrors or prisms incorporating the potentiometer in the attenuator so as to be able to precisely achieve the relative small value of the PDL meeting the industry standard which can not be reached by the prior arts. While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims. Therefore, person of ordinary skill in this field are to understand that all such equivalent structures are to be included in the scope of the following claims.

We claim:

1. A controllable attenuator comprising:
   a first collimator with an input fiber connected on one side thereof
   a first 45 degrees dielectric mirror positioned on the other side of said first collimator opposite to said input fiber;
   a second collimator arranged parallel to the first collimator with an output fiber connected on one side thereof;
   a second 45 degrees dielectric mirror positioned on the other side of said second collimator opposite of said output fiber; and
   means for attenuation positioned between the first reflection device and the second reflection device; wherein
   light coming from the input fiber through the first collimator, hitting the first reflection device, being reflected toward the second reflection device with attenuation effect thereof, further being reflected toward the second collimator and leaving from the output fiber, creates a light transmission path, so that a PDL thereof can be reduced to be below 0.1 dB; wherein
   said means includes a neutral density filter actuated to move in a direction essentially perpendicular to the light path between said first reflection device and said second reflection device; wherein
   said neutral density filter is actuated by a stepping motor; wherein
   the neutral density filter is seated upon a screw nut engaged with a lead screw which is coupled with the stepping motor via a silicon rubble coupler.

2. The attenuator as described in claim 1, wherein a neutral density filter position indicator such a potentiometer, is provided to monitor a precise position of said neutral density filter.

3. A controllable attenuator comprising:
   a collimator assembly including first and second collimators arranged in a parallel relation with each other;
   a fiber assembly including input and output fibers positioned on one side of said collimator assembly and respectively connected to the first collimator and the second collimator;
   a reflection assembly including first and second reflection devices positioned on the other side of said collimator assembly and respectively aligned with the fist collimator and the second collimator and opposite to the input fiber and the outer fiber;
   a light path being defined among the first collimator, the first reflection device, the second reflection device and the second collimator, said light path being of a U-like configuration including a pair of arms connected with a bight;
   means for attenuation is moveable to interrupt said light path along a direction perpendicular to said light path where the interruption occurs; wherein
   said first and second reflection devices are prisms arranged with 45 degrees relative to each other;
   said means includes a neutral density filter; wherein
   the neutral density filter is seated upon a screw nut engaged with a lead screw which is coupled with a stepping motor via a silicon rubble coupler.

4. The attenuator as described in claim 3 wherein a neutral density filter position indicator such as a potentiometer, is proved to monitor a precise position of said neutral density filter.

* * * * *